(12) United States Patent
Kusano et al.

(10) Patent No.: US 11,565,407 B2
(45) Date of Patent: Jan. 31, 2023

(54) LEARNING DEVICE, LEARNING METHOD, LEARNING MODEL, DETECTION DEVICE AND GRASPING SYSTEM

(71) Applicant: Preferred Networks, Inc., Tokyo-to (JP)

(72) Inventors: Hitoshi Kusano, Tokyo-to (JP); Ayaka Kume, Tokyo-to (JP); Eiichi Matsumoto, Tokyo-to (JP)

(73) Assignee: PREFERRED NETWORKS, INC., Tokyo (JP)

( * ) Notice: Subject to any disclaimer, the term of this patent is extended or adjusted under 35 U.S.C. 154(b) by 0 days.

(21) Appl. No.: 17/326,250

(22) Filed: May 20, 2021

(65) Prior Publication Data

US 2021/0276182 A1    Sep. 9, 2021

Related U.S. Application Data

(63) Continuation of application No. 16/698,177, filed on Nov. 27, 2019, now Pat. No. 11,034,018, which is a (Continued)

(30) Foreign Application Priority Data

May 31, 2017    (JP) ............................. JP2017-108550

(51) Int. Cl.
*B25J 9/16*    (2006.01)
(52) U.S. Cl.
CPC ............. *B25J 9/1612* (2013.01); *B25J 9/163* (2013.01); *B25J 9/1635* (2013.01); *B25J 9/1669* (2013.01)

(58) Field of Classification Search
CPC ...... B25J 9/1612; B25J 9/1669; B25J 9/1635; B25J 9/163; B25J 9/1697;
(Continued)

(56) References Cited

U.S. PATENT DOCUMENTS 6,445,964 B1    9/2002 White et al.
10,717,196 B2 *  7/2020 Yamazaki ................ B25J 9/163
(Continued)

FOREIGN PATENT DOCUMENTS

JP    H06-203166 A    7/1994
JP    2009-083095 A    4/2009
(Continued)

OTHER PUBLICATIONS

Di Guo et al., "Deep vision networks for real-time robotic grasp detection", International Journal of Advanced Robotic Systems, Jan.-Feb. 2017, 1-8.
(Continued)

*Primary Examiner* — Antony M Paul
(74) *Attorney, Agent, or Firm* — Foley & Lardner LLP

(57) ABSTRACT

An estimation device includes a memory and at least one processor. The at least one processor is configured to acquire information regarding a target object. The at least one processor is configured to estimate information regarding a location and a posture of a gripper relating to where the gripper is able to grasp the target object. The estimation is based on an output of a neural model having as an input the information regarding the target object. The estimated information regarding the posture includes information capable of expressing a rotation angle around a plurality of axes.

24 Claims, 5 Drawing Sheets

Related U.S. Application Data continuation of application No. PCT/JP2018/020816, filed on May 30, 2018.

(58) Field of Classification Search
CPC .......... G05B 2219/37567; G05B 2219/39476; G05B 2219/40053; H02P 21/0014; H02P 21/0025; H02P 21/18; H02P 23/0018; H02P 27/00; H02P 27/04; H02P 27/06; H02P 25/00; H02P 25/022; H02P 25/062; H02P 25/107; H02P 1/00; H02P 1/24; H02P 1/26; H02P 1/46; H02P 6/00; H02P 6/14

See application file for complete search history.

(56) References Cited

U.S. PATENT DOCUMENTS

| | | | |
|---|---|---|---|
| 2004/0186624 | A1 | 9/2004 | Oda et al. |
| 2017/0028553 | A1 | 2/2017 | Tsuda et al. |
| 2017/0028562 | A1 | 2/2017 | Yamazaki et al. |
| 2017/0090459 | A1 | 3/2017 | Koga |

FOREIGN PATENT DOCUMENTS

| | | | |
|---|---|---|---|
| JP | 2013-052490 | A | 3/2013 |
| JP | 2016-132086 | A | 7/2016 |
| JP | 2017-068325 | | 4/2017 |
| WO | WO-2016/034269 | A1 | 3/2016 |

OTHER PUBLICATIONS

Araki et al., "Grasping Detection using Deep Convolutional Neural Network with Graspability", The Robotic Society of Japan, 2016 with a machine translation.
Anh Nguyen et al., "Detecting Object Affordances with Convolutional Neural Networks", 2016.
Ulrich Klank et al., "Real-time CAD Model Matching for Mobile Manipulation and Grasping", 9th IEEE-RAS International Conference on Humanoid Robots, 2009.
Lerrel Pinto et al., "Supersizing Self-supervision: Learning to Grasp from 50K Tries and 700 Robot Hours", arXiv: 1509.06825 v1 [cs.LG] Sep. 23, 2015.
Sergey Levine et al., "Learning Hand-Eye Coordination for Robotic Grasping with Deep Learning and Large-Scale Data Collection", arXiv: 1603.02199 v4 [cs.LG] Aug. 28, 2016.
Nicolas Hudson et al., "End-to-End Dexterous Manipulation with Deliberate Interactive Estimation", IEEE ICRA, May 2012.
Menglong Zhu et al., "Single Image 3D Object Detection and Pose Estimation for Grasping", IEEE ICRA, 2014.
Alexander Herzog et al., "Learning of grasp selection based on shape-template", Autonomous Robots, vol. 36, No. 1-2, 2014.
Domae et al., "Fast Graspability Evaluation on Single Depth Maps for Bin Picking with General Grippers", IEEE ICRA, 2014.
Jeannette Bohg et al., "Data-Driven Grasp Synthesis-A Survey", IEEE Transaction on Robotics, vol. 30, No. 2, Apr. 2014.
Wanyi Li et al., "Recent Advances on Application of Deep Learning for Recovering Object Pose", IEEE International Conference on Robotics and Biomimetics, Dec. 2016.
Karen Simonyan et al., "Very Deep Convolutional Networks for Large-Scale Image Recognition", arXiv: 1409.1556v5 [cs.CV] Dec. 23, 2014.
Jonathan Long et al., "Fully Convolutional Networks for Semantic Segmentation" IEEE CVPR, 2015.
Pedro O. Pinheiro et al., "Learning to Segment Object Candidates", NIPS 2015.
Ian Lenz et al., "Deep Learning for Detecting Robotic Grasps", The International, Journal of Robotics Research, 2015.
Shaoqing Ren et al., "Faster R-CNN: Towards Real-Time Object Detection with Region Proposal Networks" NIPS, 2015.
Abhishek Gupta et al., "Learning Dexterous Manipulation for a Soft Robotic hand from Human Demonstrations", arXiv: 1603.06348V3 [cs.LG] Mar. 20, 2017.
Sergey Ioffe et al., "Batch Normalization: Accelerating Deep Network Training by Reducing Internal Covariate Schift", ICML, 2015.
Vinod Nair et al., "Rectified Linear Units Improve Restricted Boltzmann Machines", ICML, 2010.
Aäron van den Oord et al., "Pixel Recurrent Neural Networks", ICML, 2016.
Nathan Silberman et al., "Indoor Segmentation and Support Inference from RGBD Images", ECCV, 2012.
Andrei A. Rusu et al., "Sim-to-Real Robot Learning from Pixel with Progressive Nets", arXiv: 1610.04286v2[cs.RO] May 22, 2018.
Daniel Kappler et al., "Leveraging Big Data for Grasp Planning", ICRA, 2015.
Edward Johns et al., "Deep Learning a Grasp Function for Grasping under Gripper Pose Uncertainty", arXiv: 1608.02239v1 [cs.RO] Aug. 7, 2016.
Chelsea Finn at al., "Deep Visual Foresight for Planning Robot Motion", arXiv: 1610.00696v2 [CS.LG] Mar. 13, 2017.
Lerrel Pinto et al., "Learning to Push by Grasping: Using multiple tasks for effective learning", arXiv:1609.09025v1 [cs.RO] Sep. 28, 2016.
Marcus Gualtieri et al., "Viewpoint Selection for Grasp Detection", arXiv:1609.05247v3[cs.RO] Jul. 31, 2017.
Sungphill Moon et al., "Predicting Multiple Pregrasping Poses by Combining Deep Convolutional Neural Networks with Mixture Density Networks", ICONIP, 2016.
Sergey Levine et al., "End-to-End Training of Deep Visuomotor Policies", arXiv:1504.00702v5 [cs.LG] Apr. 19, 2016.
Yezhou Yang et al., "Robot Learning Manipulation Action Plans by "Watching" Unconstrained Videos from the World Wide Web", Proceedings of the Twenty-Ninth AAAI Conference on Artificial Intelligence, 2015.
Eiichi Matsumoto et al., "End-to-End Learning of Object Grasp Poses in the Amazon Robotics Challenge", Warehouse PickingAutomationWorkshop (WPAW), ICRA, 2017.
Jay MingWong et al., "Self-Supervised Deep Visuomotor Learning from Motor Unit Feedback", RSSWorkshop, 2016.
Ian Lenz et al., "Deep Learning for Detecting Robotic Grasp", arXiv:1301,3592v6 [cs.LG] Aug. 21, 2014.
Wen Su et al., "Regularized Fully Convolutional Networks for RGB-D Semantic Segmentation", 2016 Visual Communications and Image Processing, IEEE, Jan. 5, 2017.
Takahiro Hasegawa et al., "Detection of objectness by Heterogeneous Learning, and an object grasping position", The 22nd Symposium on Sensing via Image Information, Jun. 8, 2016 with a machine translation.
Hiroshi Ninomiya et al., "Preliminary study on deep manifold embedding for 3D object pose estimation", IEICE Technical Report, vol. 116, No. 91, Jun. 6, 2016, pp. 25-30 with a machine translation.
Dyrstad, J. S., "Training convolutional neural networks in virtual reality for grasp detection from 3D images," A master thesis in Industrial Automation and Signal Processing submitted to The Department of Electrical Engineering and Computer Science, University of Stavanger (Jun. 30, 2016) XP055610072, Available online, URL: http://hdl.handle.net/11250/2413962 [retrieved on Jul. 31, 2019).
Llopart et al., "Door and Cabinet Recognition Using Convolutional Neural Nets and Real-Time Method Fusion for Handle Detection and Grasping," 2017 3rd International Conference on Control, Automation and Robotics (ICCAR), IEEE, pp. 144-149, (Apr. 24, 2017) XP033104549.
Veres et al., "Modeling Grasp Motor Imagery through Deep Conditional Generational Models," IEEE Robotics and Automation Letters, arXiv:1701.03041 v1, pp. 1-8 (Jan. 11, 2017) XP080740863.
Notice of Allowance dated Feb. 2, 2021, in U.S. Appl. No. 16/698,177 (US 2020-0094406).
Ian Lenz et al., "Deep Learning for Detecting Robotic Grasps", submitted May 20, 2021 URL: https://web.archive.org/web/20170329072748/http://roboticsproceedings.org/rss09/p12.pdf.

(56) References Cited

OTHER PUBLICATIONS

Ian Lenz et al., "Deep Learning for Detecting Robotic Grasps", The International Journal of Robotics Research, 2015, vol. 34(4-5) 705-724.

Sergey Levine et al., "Learning Hand-Eye Coordination for Robotic Grasping with Large-Scale Data Collection", submitted May 20, 2021 URL: https://people.eecs.berkeley.edu/~svlevine/papers/grasp_iser.pdf.

Sergey Levine et al., "Learning Hand-Eye Coordination for Robotic Grasping with Large-Scale Data Collection", Springer International Publishing, 2017.

Andrei A. Rusu et al., "Sim-to-Real Robot Learning from Pixels with Progressive Nets," arXiv:1610.04286v1 [cs.RO] Oct. 13, 2016 URL: https://arxiv.org/pdf/1610.04286v1.pdf.

Marcus Gualtieri et al., "Sequential View Grasp Detection For Inexpensive Robotic Arms," arXiv:1609.05247v1 [cs.RO] Sep. 16, 2016 URL: https://arxiv.org/pdf/1609.05247v1.pdf.

Edward Johns et al., "Deep Learning a Grasp Function for Grasping under Gripper Pose Uncertainly", 2016 IEEE/RSJ International Conference on Intelligent Robots and Systems (IROS), Oct. 9, 2016, pp. 4461-4468, XP033012007, DOI: 10.1109/IROS.2016.7759657 [retrieved on Nov. 28, 2016].

Joseph Redmon et al., "Real-Time Grasp Detection Using Convolutional Neural Networks", 2015 IEEE International Conference on Robotics and Automation (ICRA), May 1, 2015, pp. 1316-1322, XP055288285, DOI: 10.1109/ICRA.2015.7139361, ISBN: 978-1-4799-6923-4.

Anh Nguyen et al., "Detecting Object Affordances with Convolutional Neural Networks", 2016 IEEE/RSJ International Conference on Intelligent Robots and Systems (IROS), Oct. 9, 2016, pp. 2765-2770, XP033011779, DOI: 10.1109/IROS.2016.7759429 [retrieved on Nov. 28, 2016].

Examination Report issued in European Patent Application No. 18809575.6 dated Nov. 21, 2022.

* cited by examiner

LEARNING DEVICE, LEARNING METHOD, LEARNING MODEL, DETECTION DEVICE AND GRASPING SYSTEM

CROSS REFERENCE TO RELATED APPLICATIONS

This application is a continuation of U.S. application Ser. No. 16/698,177, filed on Nov. 27, 2019, which is a continuation application of International Application No. PCT/JP2018/020816 filed on May 30, 2018, which claims priority to and the benefit of Japanese Patent Application No. 2017-108550, filed on May 31, 2017, the entire contents of which are incorporated herein by reference.

This application is a continuation application of International Application No. PCT/JP2018/020816 filed on May 30, 2018, which claims priority to and the benefit of Japanese Patent Application No. 2017-108550, filed on May 31, 2017, the entire contents of which are incorporated herein by reference.

FIELD

The embodiments described herein relate to a learning device, a learning method, a learning model, a detection device, and a grasping system.

BACKGROUND

At present, automation using a robot has been made for various uses, and research and development have been made widely in accordance with various uses. Researches for grasping an object by using an arm attached to a robot are also widely made. It is necessary to determine a location and an orientation of a gripper of the robot from a location of the object which is detected by using a detection device of the object, for example, an RGB-D camera to grasp the object by a gripper part of the robot. A method using a neural network or deep learning which is widely used also in other fields has been developed as a method estimating the location and the orientation of the gripper (refer to Japanese Patent Publication No. 2016-132086).

However, it is difficult for the conventional method to find a high-dimensional grasping posture, in particular, to predict information which is difficult to make an annotation in an image on a computer. Though there is a method to recognize a three-dimensional object by using CAD, it requires high economical and temporal costs because a CAD model is required and the grasping posture has to be determined after the object is recognized. Further, an example of learning grasping methods other than that in which a gripper grasps an object from right above cannot be found in the conventional method.

DETAILED DESCRIPTION

According to some embodiments, a learning device includes a detection means which detects a location where an object exists and information of a teaching tool grasping the object, a supervised data generation means which converts the information of the teaching tool detected by the detection means into information of a location and posture of the teaching tool and generates a supervised data which is data linking between locational information where the object exists and information of the location and posture of the teaching tool grasping the object. The learning device further includes a learning part which learns a learning model by using the supervised data. The learning model is a learning model which is represented by a neural network model including a plurality of layers and outputs data of a location and posture of a grasping means capable of grasping a target object when a location where the target object exists is input through the detection means.

Embodiments will now be explained in more detail with reference to the drawings. Note that the embodiments are not intended to limit the present disclosure. Further, in each drawing, components having substantially the same functions are denoted by the same reference signs, and duplicating explanations of the same components are not given.

A learning device according to the present embodiment is to learn a model where, for example, information of a location and an orientation of a gripper capable of grasping an object is output by using an image photographed by a camera which is provided to capture an object to be a target (hereinafter, denoted as a target object) when the target object is grasped by a gripper which is attached to a robot or a component of the robot.

Figure 1:
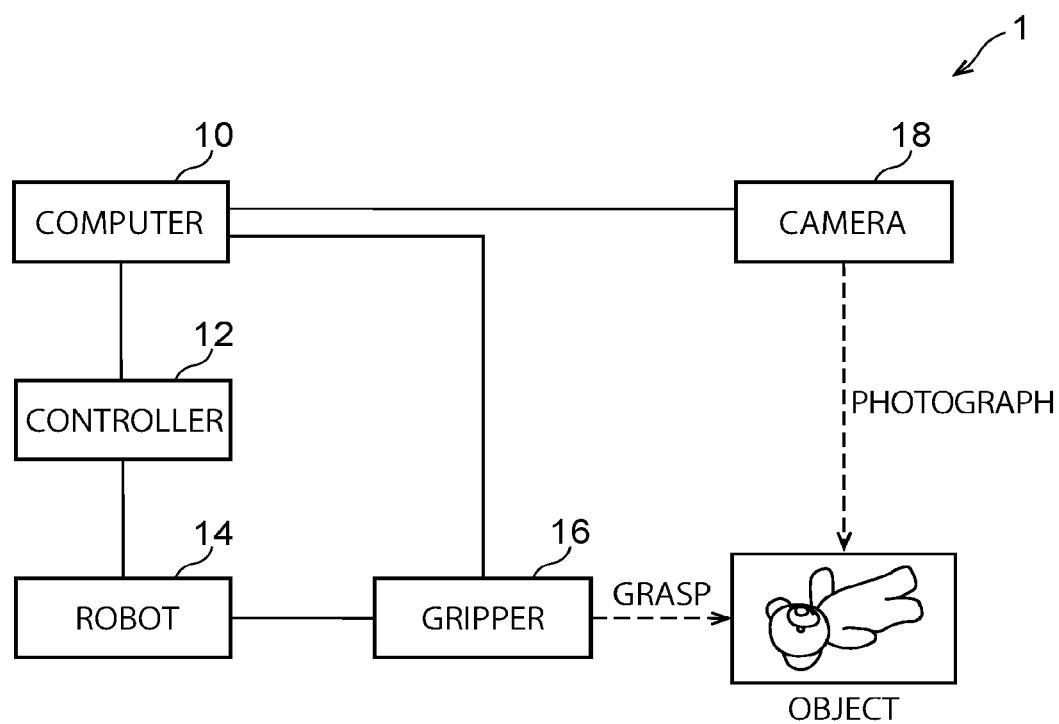
FIG. 1 is a diagram illustrating an outline of a grasping system according to one embodiment.

FIG. 1 is a grasping system of grasping an object by a robot using a learning model which is learned by a learning device according to the present embodiment. A grasping system 1 includes a computer 10, a controller 12, a robot 14, a gripper 16 and a camera 18.

The computer 10 may be a computer which is connected to the controller 12, the gripper 16 and the camera 18, and may control the entire grasping system 1, and includes, for example, a CPU (central processing unit), various memories and user interfaces. Learning models that are learned by the learning device may be stored in this computer 10. The learning device may be mounted in the computer 10. An accelerator such as a GPU (graphics processing unit) which performs arithmetic operations for learning or applying actual measurement values to the learning model may be mounted.

The controller 12 may be a control device which receives a signal from the computer 10 and transmits a signal to control the robot 14 to the robot 14. The controller 12 may convert the signal received from the computer 10 into the signal to control the robot 14 and transmit the signal to operate the robot 14.

This controller 12 may not be provided when the conversion of the signals or the like is performed in the computer 10. Further, the computer 10 and the controller 12 may be mounted on the robot 14. That is, the computer 10, the controller 12 and the robot 14 may be configured as an integrated robot. These configurations are variable based on other factors such as resources and costs.

The robot 14 may be a casing that supports the gripper 16 grasping the object. In the explanation of the present embodiment, the robot 14 is mainly explained as a support casing of the gripper 16, but it is not limited thereto and may be one having other functions and used for other uses.

The gripper 16 is a device (e.g., grasping means or an end effector) to receive information of a graspable location and posture from the computer 10 and to grasp a target object, and for example, it is a grasping device (gripper) including three movable claw parts. The claw part has, for example, one or a plurality of joints, and can be controlled to be operated by each joint. The gripper 16 may be controlled by the computer 10, the controller 12 or the robot 14. That is, the gripper 16 may be controlled by a control part. When the target object is grasped, the gripper 16 may be controlled based on the information of the location and posture received from the computer 10.

A constitution of the gripper 16 may be a slide-type or a lever-type without being limited to the claw type. The number of claws is also not limited to three pieces and may be two pieces or four or more pieces. This gripper 16 may be physically or electrically connected to the robot 14 through, for example, an arm (non-illustrated).

The gripper 16 may not be connected to the computer 10. In this case, the gripper 16 may acquire the information of the location and posture (three-dimensional direction) to grasp the target object through the controller 12 and the robot 14.

In the following explanation, a location of the gripper 16 may indicate the location of the gripper 16 with respect to a reference point. The reference point of the gripper 16 may be a point so that the location of the gripper 16 can be uniquely determined in the grasping system 1 when locational information is given to the gripper 16. For example, when the gripper has the three claws, a center point (it may be a gravity center) of tips of claws each at an initial location (for example, a location where the claw is the most extended) of these claws may be set as the reference point of the gripper 16, or a point where these claws are installed may be set as the reference point of the gripper 16. Otherwise, a point where the arm of the robot 14 and the gripper 16 are connected may be set as the reference point of the gripper 16, and the reference point is not limited to the above.

Further, though there is a case when the location of the gripper 16 is adjusted by an operation of the arm of the robot 14, the control of the location and posture of the gripper 16 may include the control of the location or the posture of the gripper 16 and control of the operation of the arm of the robot 14, in the following explanation.

The camera 18 may be a capturing device which is connected to the computer 10 to capture an image of the object from a predetermined location and direction. The camera 18 is, for example, an RGB-D camera photographing the object from a vertical direction, and captures an RGB value of the object at a horizontal location (x, y) with respect to an imaging plane of the camera 18 while setting a predetermined point as a reference (hereinafter, it is denoted as a reference point of the camera 18), and a perpendicular location z (depth) with respect to the imaging plane of the camera 18 at each location (x, y) of the object.

As mentioned above, the camera 18 may be a detection device capable of detecting a three-dimensional location of another object without being limited to the RGB-D camera as long as it is a device capable of capturing a location (x, y, z) where the object exists. For example, it may be a device capable of capturing a three-dimensional location of the object by including a plurality of cameras to capture the object from two directions or three directions. It may not be a camera to photograph visible light but other detection devices capable of three-dimensionally measuring the object.

Note that in FIG. 1, the camera 18 is connected to only the computer 10, but it is not limited thereto. For example, the camera 18 may be mounted on the computer 10 or may be installed or mounted on the robot 14, or the like. In this case, the camera 18 may be directly connected to the computer 10 or connected to the computer 10 through the robot 14 or the like.

The reference point of the camera 18 may be set to, for example, a location of the camera 18 or an initial location of the gripper 16. The reference point is not limited thereto, and a point where the location (x, y, z) of the measured object can be uniquely determined may be set as the reference point of the camera 18. In this case, the camera 18 is basically located at a fixed location in the grasping system 1. That is, it is desirable that a system photographing supervised data (e.g., photographing an image that is used to generate supervised data) and a system photographing the target object are the same system.

The camera 18 may be, for example, connected to the arm of the robot 14 together with the gripper 16 or attached to the gripper 16. The reference point of the camera 18 may be set to be the same as the reference point of the gripper 16. The reference point may be set separately to be a coordinate system capable of uniquely determining a location of each point of the object photographed by the camera 18 in the grasping system 1. In this case, for example, the location where the object exists in the grasping system 1 may be calculated based on the location of the camera 18 with respect to the reference point of the camera 18 and a coordinate of each location of the object in an image photographed by the camera 18.

The reference point of the gripper 16 and the reference point of the camera 18 may be the same. In this case, a three-dimensional coordinate in the grasping system 1 can be handled in the same coordinate system. As the posture of the gripper 16 or the like, for example, a posture in parallel to an x-axis on an x-y plane may be set as a reference in these three-dimensional coordinate systems. The location and posture of the gripper 16 or the like may be anything as long as they can be uniquely determined in the grasping system 1.

A system which photographs an image generating the supervised data and a system which grasps the target object may be different. In this case, in the system which grasps the target object, for example, it is desirable that a distance between the camera 18 and the object and a relative locational relationship between the reference point of the camera 18 and the reference point of the gripper 16 are equivalent to those of the system which photographs the image generating the supervised data. The present embodiment can be applied to other cases by correcting the coordinate of the target object in the image and output information of the location and posture of the gripper 16.

When the camera 18 is fixed in the grasping system 1, the camera 18 may be installed at a location 75 cm apart from a plane where the object is installed in a vertical direction so that the plane with a size of 70 cm×50 cm can be photographed, as an example. This is an example, and not intended to exclude other installation methods.

Figure 2:
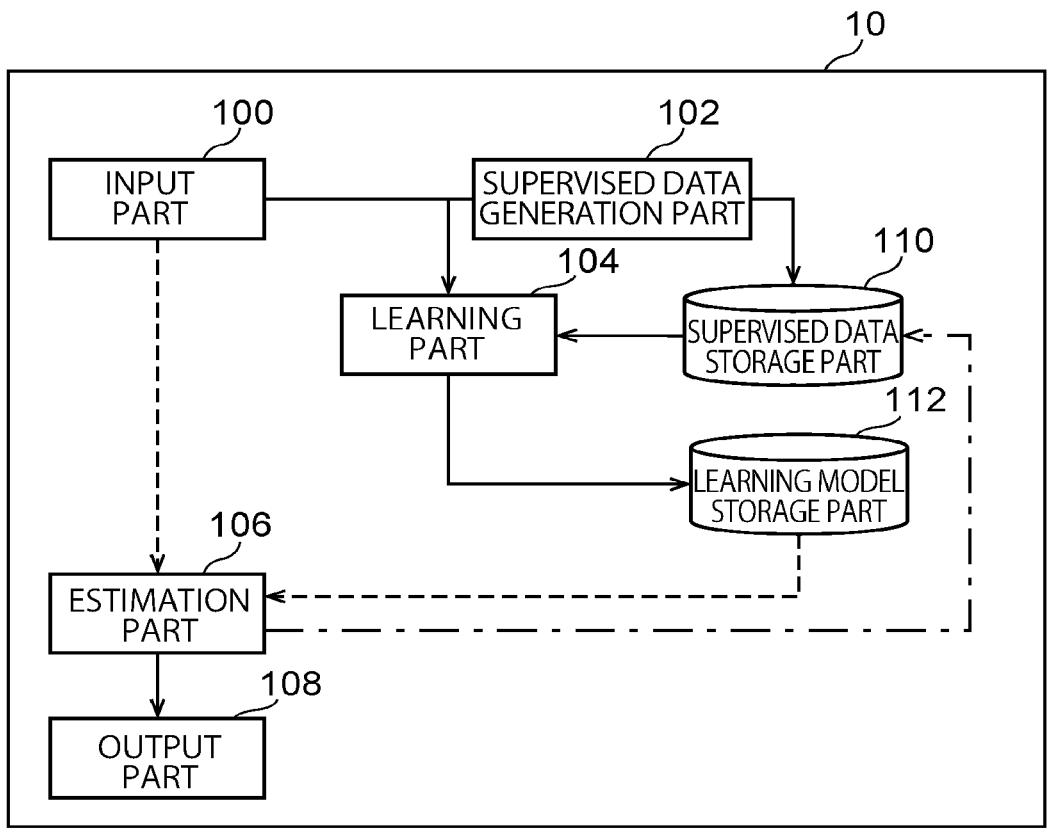
FIG. 2 is a block diagram illustrating functions of a computer according to one embodiment.

FIG. 2 is an example of a block diagram illustrating functions of the computer 10. The computer 10 includes, for example, an input part 100, a supervised data generation part 102, a learning part 104, an estimation part 106, and an output part 108. A supervised data storage part 110 storing the supervised data and a learning model storage part 112 storing learning models that are learned based on the supervised data are further included. A configuration of the CPU or the like is not illustrated. Solid lines in the diagram each illustrate a flow of data in a learning phase, and dotted lines each illustrate a flow of data in an estimation phase of grasping information.

Data or the like may be input to the computer 10 through the input part 100. The input data may be an image of a teaching tool 2 illustrated in FIG. 3 grasping an object which is photographed by the camera 18 to be the supervised data in a case of the learning phase. The input data may be an image of the target object to be a grasping target in a case of the estimation phase. A request for learning and a request for estimating the grasping information may be input through non-illustrated user interfaces.

When the image of the teaching tool 2 is input to the computer 10 through the input part 100, the supervised data generation part 102 may convert the input image data and generate the supervised data. Details of conversions from the input image into a three-dimensional location and a three-dimensional posture included in the supervised data are described later.

The learning part 104 may generate a learning model to estimate the grasping information by using the supervised data stored in the supervised data storage part 110. The learning part 104 may generate the learning model based on the data stored in the supervised data storage part 110 in accordance with a request from a user, and store the generated learning model to the learning model storage part 112. The learning part 104 may output a status state of during learning and information indicating that learning is finished to the output part 108.

The estimation part 106 may estimate information of a location and posture to grasp a target object based on the learning model. For example, when a request to estimate the grasping information is received through the input part 100, the estimation part 106 may estimate information of a location (for example, a three-dimensional location) and a posture (for example, a posture in a three-dimensional direction) where the gripper 16 is able to grasp the target object regarding the input image of the target object based on the learning model stored in the learning model storage part 112. The estimated information may be displayed on, for example, the output part 108, or transmitted to the robot 14 or the gripper 16 through the output part 108.

The information estimated by the estimation part 106 can be fed back as new supervised data. The information estimated at the estimation part 106 and information whether the gripper 16 is actually able to grasp the target object or a result in which the user checked the information and estimated whether the target object can be grasped may be output to the supervised data storage part 110 as the supervised data.

In FIG. 2, it is explained on an assumption that the learning part 104 and the estimation part 106 are in the same computer 10, but the present embodiment is not limited thereto. That is, the learning part 104 and the estimation part 106 may be included in separate computers based on the common learning model storage part 112. Further, the supervised data storage part 110 and the learning model storage part 112 may not be included in the computer 10, and for example, a database server and the like through network may be included, and they may be included in the database server.

When the computer 10 has the configuration as illustrated in FIG. 2, the computer 10 may be a learning device which optimizes the learning model to acquire the information of the location and the posture where the gripper 16 is able to grasp the target object, and also the computer 10 may be an estimation device which estimates the information of the location and posture where the gripper 16 is able to grasp the target object based on the learning model.

Figure 3:
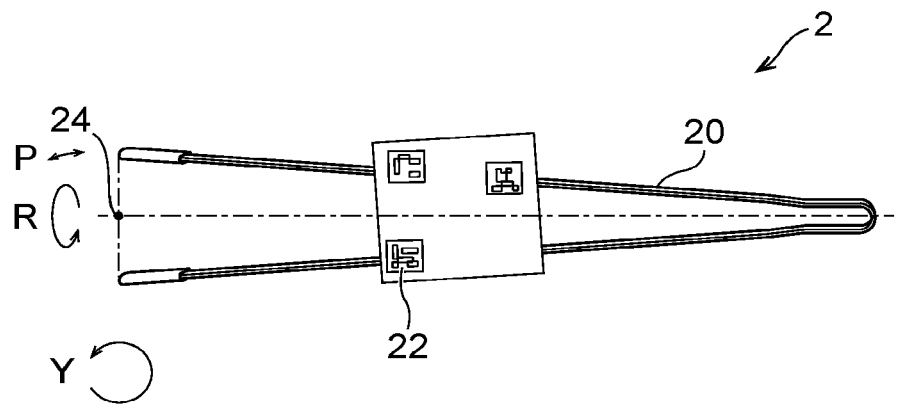
FIG. 3 is a diagram schematically illustrating a teaching tool to acquire supervised data according to one embodiment.

FIG. 3 is a diagram illustrating an example of the teaching tool 2 which is used to create the learning model according to the present embodiment. The teaching tool 2 includes a teaching tool main body 20 and markers 22.

The teaching tool main body 20 may be a tool that is operated by a human when the supervised data is created, and a location and posture of the teaching tool 2 capable of grasping the object can be accumulated as the supervised data by the teaching tool main body 20 grasping the object.

The marker 22 may be a marker that is fixed to the teaching tool main body 20. The location of the teaching tool 2 photographed by the camera 18 can be found by extracting the location of the teaching tool main body 20, but the posture of the teaching tool 2 is often difficult to be extracted only by acquiring an image of the teaching tool main body 20.

It becomes possible to estimate the posture of the teaching tool 2 by fixing the marker 22 to the teaching tool main body 20, detecting the marker 22 from the image, and estimating a location (x, y, z) or a posture (R, P, Y) of each marker 22 in a three-dimensional space. In FIG. 3, the marker 22 may be formed by three different markers, but it is not limited thereto and may be formed by one or two markers as long as reading accuracy can be secured. A direction using two vectors in a longitudinal direction and a short-side direction of the teaching tool main body 20 as a base may be detected to increase the accuracy.

It is not limited to use the marker 22, but the location or posture of the teaching tool 2 may be extracted by using, for example, a triaxial sensor, a six-axis sensor, light, radio waves, acoustic waves, and so on. Further, the graspable data may be acquired as the supervised data in the above description, but it is not limited thereto, and ungraspable data may also be collected by using the teaching tool 2. The learning using not only positive data but also negative data may be thereby enabled.

A teaching tool reference point 24 may be a point to be a reference for the location and posture of the teaching tool 2. The three-dimensional location (x, y, z) of the teaching tool 2 may be measured by using the location of the teaching tool reference point 24 as a reference. For example, the location of the teaching tool 2 may be determined by the supervised data generation part 102 finding the location of the teaching tool reference point 24 based on the location of the marker 22. More simply, the location (x, y) of the teaching tool 2 may be set to a central location between two endpoints of the teaching tool 2. The location z may be found from a measurement result when the camera 18 is the RGB-D camera.

The location of the teaching tool 2 may be one which is expressed so as to be uniquely determined in the grasping system 1. For example, it may be one relatively expressing the location of the teaching tool reference point 24 with respect to the reference point of the gripper 16 or may be one relatively expressing the location of the teaching tool reference point 24 with respect to the reference point of the camera 18.

The posture of the teaching tool 2 may be detected by reading the marker 22. That is, the posture (R, P, Y) may be detected as a roll angle R, a pitch angle P, and a yaw angle Y while setting a longitudinal direction of the teaching tool main body 20 as a reference centering around the teaching tool reference point 24. For example, the posture may be detected by a degree of inclination of the short-side direction with respect to the longitudinal direction of the teaching tool main body 20 (R), a degree of inclination of the longitudinal direction from a horizontal direction (P), and a degree of rotation of the longitudinal direction and the short-side direction on a horizontal plane (Y). At this time, information of the image of the teaching tool 2 photographed by the camera 18 may be converted into postural information by the supervised data generation part 102 calculating an inclination of the marker 22 in each direction by finding a perspective transformation matrix while setting, for example, a three-dimensional direction of the teaching tool 2 under a state of being installed at a predetermined posture on the horizontal plane as a reference.

Next, operations in each phase are explained. First, the learning model to estimate the information of the location and posture of the gripper 16 capable of grasping the target object is explained.

Figure 4:
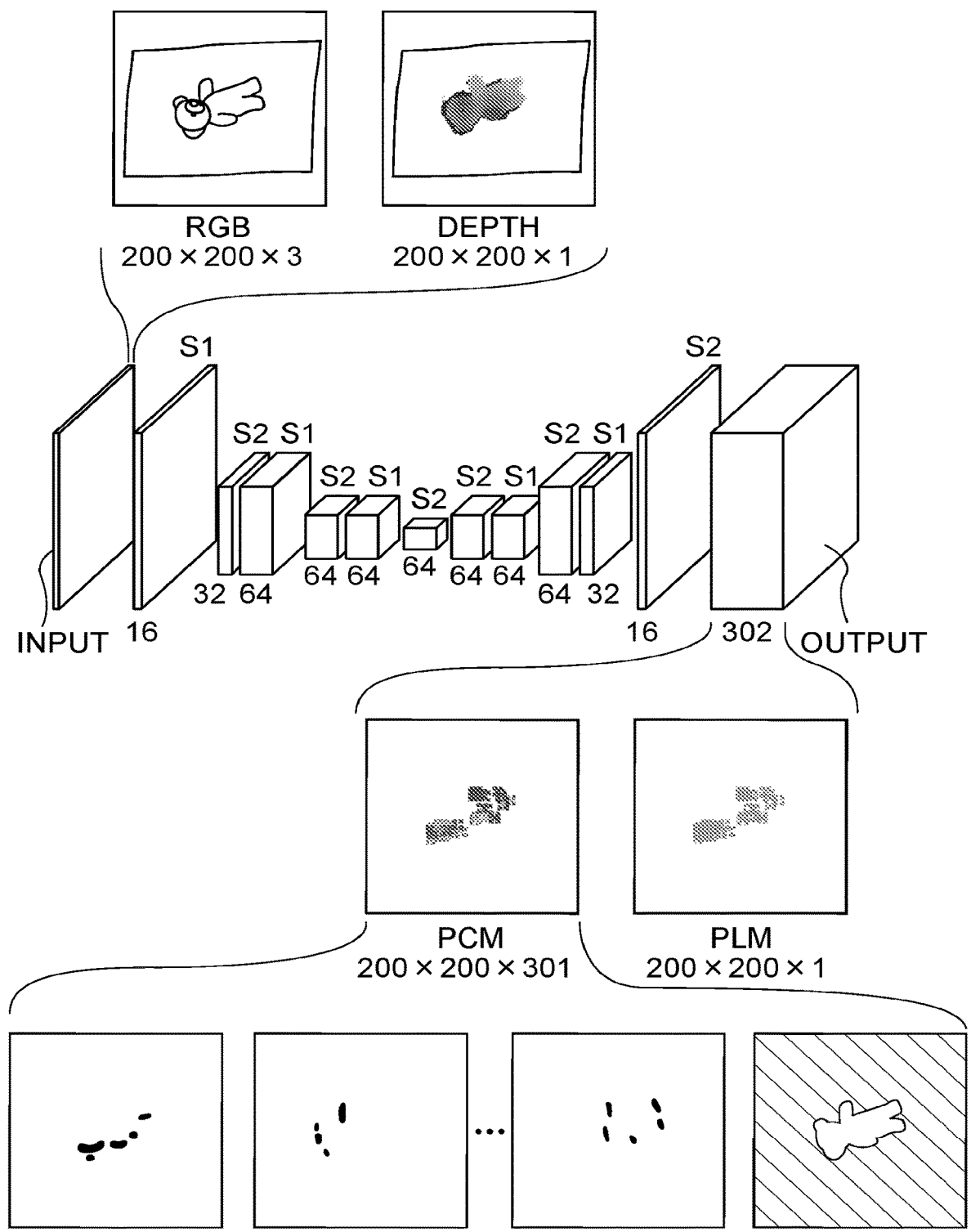
FIG. 4 is a diagram illustrating layers of a learning model according to one embodiment.

FIG. 4 is a diagram illustrating an example of a learning model in the present embodiment. As illustrated in FIG. 4, the learning model is formed by FCN (fully convolutional network). FCN is one kind of a convolutional neural network (hereinafter, described as CNN), and it is the learning where all arithmetic operations between layers are performed by convolution operations. That is, it is a network where pooling layers and fully connected layers do not exist. A network where a configuration is not complicated and a calculation cost is low can be formed by using FCN. Other networks may be used for the learning model without being limited to FCN.

In this learning model, when three pieces of images related to RGB image with 200×200 pixels and one piece of depth map image are input as input images, a location map (PLM: predicted location map) and a posture and depth map (PCM: predicted configuration map) which are predicted to be able to be grasped may be output. The PLM and the PCM may be information indicating whether an object can be grasped by each pixel photographed by the camera 18.

More concretely, the PLM may be a map indicating whether there is a possibility that the target object can be grasped when the gripper 16 exists at the two-dimensional location (x, y). For example, each pixel of the PLM is a map which shows a value near one when the target object can be grasped if the gripper 16 exists at the location (x, y) corresponding to the pixel, and shows a value near 0.5 or a value of 0.5 or less when the target object cannot be grasped. As described later, the output data of the PLM and the PCM may become a region of (0, 1) through a sigmoid function.

The PCM may be a map where four-dimensional information of a depth and posture having a possibility that the target object can be grasped if the gripper 16 is operated to be at a depth and posture (z, R, P, Y) is mapped into the two-dimensional location (x, y). This PCM is concretely generated as described below. First, the four-dimensional information where the target object can be actually grasped from among the data detected by the camera 18 may be clustered into, for example, 300 patterns to be prepared as the supervised data. The PCM may be a map where the estimated four-dimensional information of the depth and posture of the gripper 16 is mapped into the two-dimensional location (x, y) which has a possibility that the target object can be actually grasped by each supervised data, that is, at each clustered depth and posture, by referring to the clustered supervised data.

Since there are almost infinite patterns in the four-dimensional information having the possibility that the gripper 16 is able to grasp the target object with respect to the target object, the results where the combinations of the depths and the postures are clustered into the above-stated 300 patterns are used to reduce the number of patterns. A k-means method may be used as an example of the clustering, but other general clustering methods can be used. In the present embodiment, the PCM may be generated by using 301 patterns of the supervised data including a supervised data when the object cannot be grasped.

Each layer in FIG. 4 is explained. S1 or S2 denoted at an upper side of each layer represents a stride at a convolution time into the layer. It is indicated that in a case of S1, the stride is one, and in a case of S2, the stride is two. Here, a convolution kernel of 3×3 is used for the layer represented by S1, and a convolution kernel of 4×4 is used for the layer represented by S2. Numeric characters of 16, 32, 64, 302 denoted at a lower side of respective layers represent the number of channels of each layer.

A leftmost layer is an input layer, and data where an object of 200×200 (pixels)×4 (channels) is photographed is input. In the next layer (hereinafter, the layers are sequentially called a first layer, a second layer, . . . from a left side except for the input layer and an output layer), the convolution operation is performed between data of four channels input to the input layer and the 3×3 size kernel to generate data of 16 channels with the same size. That is, the first layer becomes a layer with a size of 200×200×16. Padding at the convolution time is set to one. It is represented by pseudo-code of Chainer (registered trademark) as follows.

layer1=Convolution2d(4,16,3, stride=1, pad=1)(input)

More concretely, the convolution operation may be performed by using the 16 patterns of 3×3 size kernels for each channel of the input image to generate data of the first layer with 16 channels. That is, there are kernels for R (red), G (green), B (blue), and D (depth) images as one set of kernels, and the kernel corresponding to each channel may be convolution-integrated for each channel of the input image. The results of the convolution integrals may be synthesized as one image.

The synthesization may be performed by, for example, performing weighted addition of the image of each channel with a predetermined weighting. A weighting coefficient can be included in each kernel, and in this case, an output channel is generated by adding an output of each channel after convoluting each channel with a corresponding kernel. Conversion from four channels into 16 channels may be performed by applying the set of the 16 patterns of kernels to the input image.

Further, at all layers except a final layer (e.g., the 11th layer in FIG. 4), batch normalization may be performed after the convolution operation, and ReLU (rectified linear unit) may be applied as an activation function. Here, the batch normalization may be a process where normalization is performed such that the mean of each channel becomes "0" (zero), and the variance becomes one. The ReLU represents a conversion where a negative definite in the data is set as "0" (zero). It is represented by the following pseudocode.

layer1=relu(BatchNormalization(layer1))

The second layer is a layer of data with a size of 100×100×32 where the convolution operation is performed between the first layer and the 4×4 size kernel and the number of channels is set to 32. It is similarly represented by the following pseudocode.

layer2=Convolution2d(16,32,4, stride=2, pad=1)
        (layer1)

Down-sampling may be performed by alternately executing the convolution with the stride 1 by the 3×3 size kernel (without size change) and the convolution with the stride 2 by a 4×4 size kernel (down-sampling) up to the sixth layer with a size of 25×25×64. Further, the normalization and the activation may be performed similarly to the above.

layer2=relu(BatchNormalization(layer2))

After that, the process may proceed to an up-sampling process. The up-sampling may be executed by performing a reverse operation to the down-sampling. For example, the seventh layer is represented as follows.

layer7=Deconvolution2d(64,64,4, stride=2, pad=1)
        (layer6)

The up-sampling may be executed by performing the reverse operation to the down-sampling up to the 11th layer with the size of 200×200×16. The normalization and the activation may be similarly executed also in the process of the up-sampling, and for example, it is represented as follows.

layer7=relu(BatchNormalization(layer7))

At the final layer, activation may be performed using the sigmoid function instead of the above-described activation. The network may estimate six-dimensional locational and postural information (x, y, z, R, P, Y) capable of grasping the target object from a result obtained at the final layer by inputting the result of the clustering of the information of the location and posture capable of grasping the target object as the supervised data, and the estimation result may be output to the output layer. For example, the (x, y) data with a size of 200×200×1 may be output as the PLM, and a (z, R, P, Y) data with a total size of 200×200×301 where the graspable data with a size of 200×200×300 and the ungraspable data with a size of 200×200×1 are added may be output as the PCM.

At the final layer, the PCM may be output as, for example, each image illustrated at a lowermost part in FIG. 4. This image may be mapping data indicating the two-dimensional location (x, y) where the target object can be grasped at the depth and posture indicated by the supervised data for each of the clustered supervised data. For example, images, where the mapping data with respect to the respective supervised data are colored by separate colors, may be synthesized and output as an image indicating the PCM. When these images are synthesized into an image, each location (x, y) may be colored by a color showing the cluster having the highest output value. Meanwhile, since the PLM is an output of one channel, a value output from the final layer may be converted into an image through a scaling method by gray scale or other colorings to be output.

Note that the above-mentioned learning model is shown as an example, and learning and optimization through other networks may be performed. For example, learning through a network including a pooling layer and a fully connected layer such as a general CNN may be performed.

Figure 5:
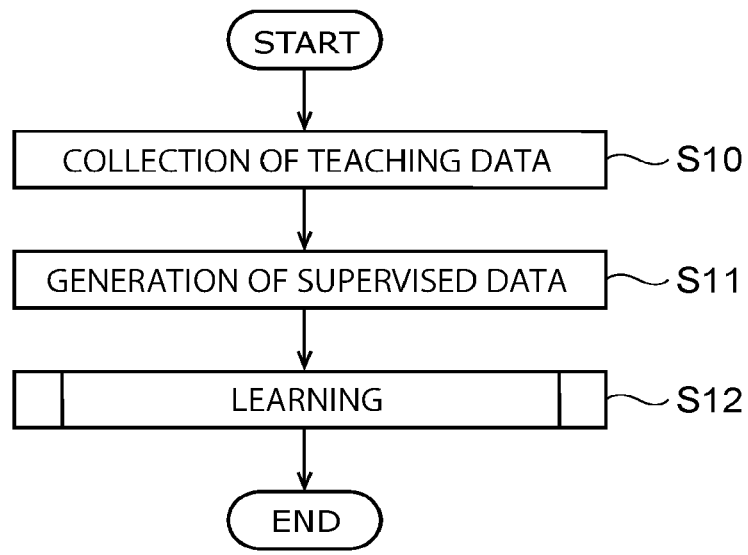
FIG. 5 is a flowchart illustrating processes of a learning phase according to one embodiment.

Next, a learning phase generating the learning model is explained. FIG. 5 is a flowchart illustrating learning processes in the present embodiment.

First, image data of the object and the teaching tool 2 photographed by the camera 18 may be collected (step S10). This image data may be acquired by inputting a plurality of graspable locations and postures where the teaching tool 2 is able to grasp each of the plurality of objects through the camera 18. A plurality of grasping locations and grasping postures may be input regarding each of the plurality of objects as image data for converting into the supervised data. The acquired supervised data may be input to the supervised data generation part 102 through the input part 100.

As an example, when the number of objects is seven, respective objects are disposed at arbitrary 12 locations and postures, and 100 graspable locations and postures are set for each disposition, 12×100=1200 patterns of image data are collected for each object, and 7×12×100=8400 patterns of image data are collected as a total.

Next, a conversion process into the supervised data may be performed regarding each of the acquired image data (step S11). The supervised data generation part 102 may convert the input image data to generate the supervised data. The generated supervised data may be stored in the supervised data storage part 110. For example, when a lot of data are acquired as stated above, the output information of the location and posture capable of grasping the target object becomes almost infinite patterns. The supervised data generation part 102 therefore may classify the four-dimensional information of the location (z) and the posture (R, P, Y) where the teaching tool 2 is able to grasp the object into, for example, 300 patterns of information of graspable locations and postures by using the clustering method such as the k-means method. These clustering results may be stored in the supervised data storage part 110.

A set of supervised data may be data including data where a four-dimensional (for example, R, G, B, D) object image and six-dimensional (for example, x, y, z, R, P, Y) information of a location and posture capable of grasping the object are linked. That is, data including a plurality sets of supervised data with respect to each of a plurality of objects may be stored in the supervised data storage part 110.

Next, learning may be performed (step S12). For example, Adam (adaptive moment estimation) may be used for the optimization of the learning. When Adam is used, learning parameters may be set as α=0.0004, batch size: 80, and the like. The optimization method of learning is not limited to Adam, and other optimization methods such as NAG, Adagrad, RMSprop, Adadelta, may be used. Pre-training to find an initial value at the learning time may be performed. The pre-training may be executed by using, for example, a VGG16 model.

Besides, data may be artificially generated by a method of label-preserving transformation to suppress over-fitting. This method may be a method where, for example, artificial data where data labeled to be graspable is locally changed is created, and it is assumed that the data is also the information of the graspable location and posture.

For example, when there are two supervised data where the locations and postures of the gripper 16 are near, a new supervised data may be generated on an assumption that information of a location and posture at a midpoint of these data is the information of a graspable location and posture. For example, the above-stated 8400 patterns of data may be thereby almost tripled to be intensified. By reinforcing the number of samples as stated above, it becomes possible to suppress a possibility of occurrence of over-fitting where, for example, information of a certain location and posture is graspable, but when only the roll angle is slightly displaced from the information of the location and posture, it is judged to be ungraspable.

In the learning, for example, optimization of the learning model may be performed by using the following evaluation function. Concretely, supervised learning may be performed by using the following evaluation function to optimize, for example, kernels used for the convolution between respective layers. Since an output image in the following is an output of the sigmoid function as described above, pixel values of the output image do not become "0" (zero) and "1".

As an evaluation function of the PLM $$L_{PLM} = \frac{1}{nWH}\sum_{k=1}^{n}\sum_{i=1,j=1}^{W,H}\left(at_k^{(i,j)}\log y_k^{(i,j)} + (1-t_k^{(i,j)})\log(1-y_k^{(i,j)})\right)$$ [equation 1]

Here, "a" is a magnification, "n" is a total number of learning data, "W/H" is width/height of an image used for learning, "t" is a PLM to be a target, and "y" is an output. The magnification "a" is, for example, 200.

As an evaluation function of the PCM $$L_{PCM} = -\frac{1}{nC}\sum_{k=1}^{n}\frac{1}{S_k}\sum_{c=1}^{C}\sum_{i=1,j=1}^{W,H}\left(t_k^{(i,j)}\left(Cu_k^{(i,j,c)}\log y_k^{(i,j,c)} + (1-u_k^{(i,j,c)})\log(1-y_k^{(i,j,c)})\right)\right)$$ [equation 2]

Here, "C" is the number of classes, "$S_k$" is a total number of pixels where "$t_k^{(i,j)}=1$", "u" is a PCM to be a target, and "y" is an output.

Learning may be executed by optimizing a learning model by using an evaluation function $L=L_{PLM}+\lambda L_{PCM}$ represented by the evaluation function of the PCM and the evaluation function of the PLM through backpropagation. Here, "λ" is, for example, 200. For example, each kernel performing the convolution may be optimized through the learning as stated above. The evaluation function may be any function as long as the PLM and the PCM can be evaluated and is not limited to the above. In the learning phase, the supervised data may be divided into two groups to perform cross-validation. The learned learning model may be stored in the learning model storage part 112.

Figure 6:
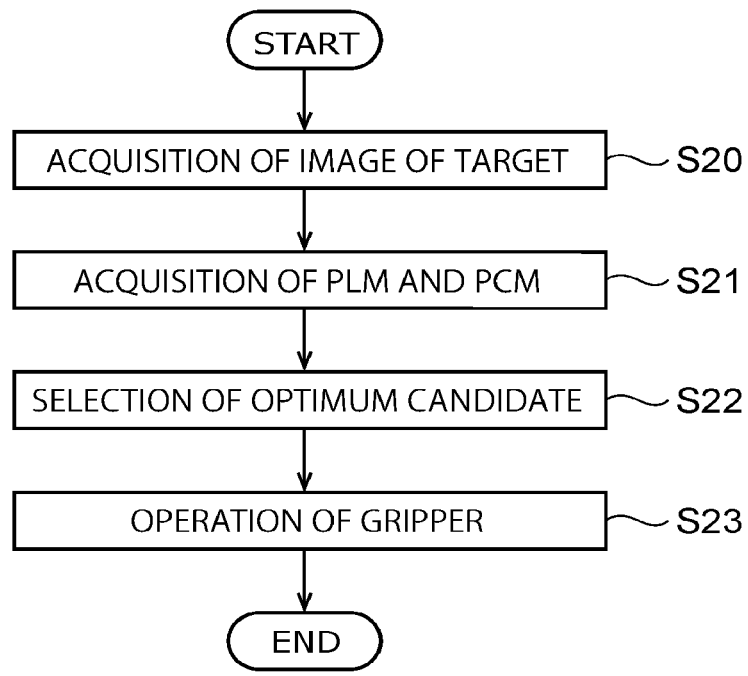
FIG. 6 is a flowchart illustrating processes of an estimation phase according to one embodiment.

The learning model as illustrated in FIG. 4 may be generated by performing the learning as stated above. Next, an estimation phase of information of graspable location and posture when an image of a target object is photographed is explained. FIG. 6 is a flowchart illustrating estimation processes in the present embodiment.

First, the estimation part 106 may acquire the images of the target object photographed by the camera 18 through the input part 100 (step S20). When the camera 18 is the RGB-D camera, images of respective color components of R, G, B illustrated on a plane and an image indicating respective depths in the photographed image may be acquired as the images.

Next, the estimation part 106 may input the image acquired at the step S20 to the learning model stored in the learning model storage part 112 as an input image, and acquire the PLM and the PCM each indicating the location and posture of the gripper 16 which is able to grasp the target object (step S21). The image of the target object acquired by the camera 18 may be input to the leftmost input layer illustrated in FIG. 4. The PCM and the PLM for the target object may be output by the learning model including the convolutional network where the image is input.

Note that the outputs of the PCM and the PLM may be output as images as illustrated in FIG. 4 through the output part 108. The image of the PLM may output the locations of the gripper 16 which have a high possibility that the gripper 16 is able to grasp the target object as an aggregation of dots. The PCM may be output as an image by collating the four-dimensional data (z, R, P, Y) of the depth (for example, a distance in the vertical direction from the camera 18) of the gripper at each dot and the posture with the result of the clustered 300 patterns. For example, respective classes may be output as different colors on the image as mentioned above.

Next, the estimation part 106 may select information with a high score from the data of the depth and posture of the graspable gripper 16 output by the learning model and output the information through the output part 108 (step S22). For example, the output maps of the PLM and the PCM in themselves are referred to as the score.

Next, the gripper 16 where the information of the graspable location and posture is received from the computer 10 through the output part 108 may be operated, and thereby, the robot 14 is able to grasp the target object by using the gripper 16 (step S23).

Figure 7A:
FIG. 7A, FIG. 7B and FIG. 7C are diagrams each illustrating an example of a target object and an estimated grasping location and posture according to one embodiment.
Figure 7B:
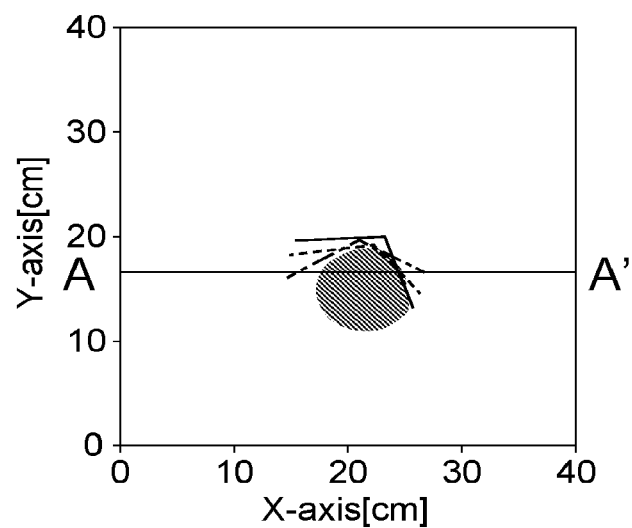
Figure 7C:
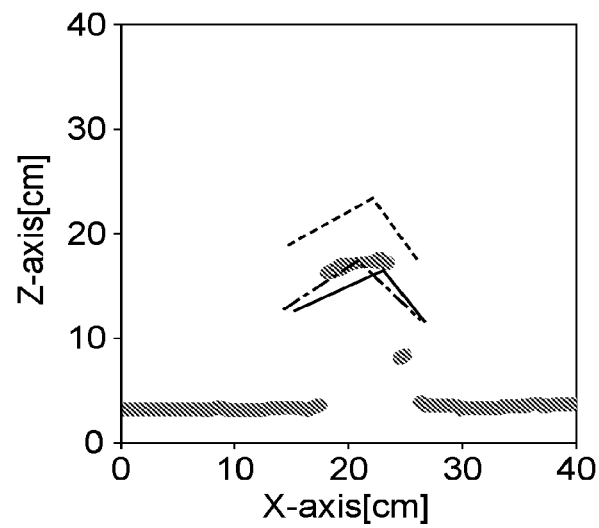

FIG. 7A is an example of a target object. As illustrated in FIG. 7A, the target object is, for example, a bottle. FIG. 7B and FIG. 7C are diagrams each illustrating a grasping location and posture of the target object estimated by the above-stated learning model. In these diagrams, the learning model is optimized by using seven kinds of objects for the supervised data, and the target object which is not used as the object for the supervised data is applied to the learning model.

FIG. 7B is a diagram illustrating the location and the posture grasping the target object from an upper surface, and FIG. 7C is an A-A' sectional view of FIG. 7B. In these FIG. 7B and FIG. 7C, a solid line illustrates the location and posture of the gripper 16 based on the information of the graspable location and posture with the highest score, subsequently, a dotted line, and a dot and dashed line have the higher score in this order.

It can be read from these diagrams that the gripper 16 is able to grasp the target object when the gripper 16 is at the location and posture based on the information of the graspable location and posture with the highest score. That is, the gripper 16 is located at the location in the horizontal direction illustrated in FIG. 7B and in the vertical direction illustrated in FIG. 7C, and it can be read that the posture of the gripper 16 is set to sandwich the target object in each diagram. It can be also read that the target object is similarly graspable regarding each of the dotted line and the dot and dashed line.

In examples illustrated in FIG. 7B and FIG. 7C, first, a point (x, y) where the output value of the PLM is the highest is extracted as the score, and the information of the three graspable locations and postures are illustrated in descending order of the score of the PCM at the point (x, y). The graspable location and posture may be extracted by evaluating the output values of the PLM and the PCM by using predetermined evaluation functions, without being limited to the above method. For example, the location and posture having the highest product of the output values of the PLM and the PCM may be simply output, or the location and the posture having the highest value of a weighted average of the PLM and the PCM obtained by a predetermined weighting may be output.

As mentioned above, according to the present embodiment, it becomes possible to estimate information of a graspable location and posture with high degree-of-freedom, in other words, adapted to high-dimensional degree-of-freedom by using a learning model which is optimized based on a multidimensional, for example, six-dimensional supervised data. In the above-stated embodiment, the six-dimensional supervised data is used, but for example, it is possible to estimate information representing a graspable state for higher-dimensional degree-of-freedom by using the supervised data based on other parameters such as a bending state of the claw of the gripper 16 at a joint, and a distance between the claws. The learning method according to the present embodiment can be used also in a case when variously-shaped-grasping means are used by having high-dimensional degree-of-freedom.

For example, when a motion of the joint of the gripper 16 is learned and output as the graspable information, the teaching tool may be transformed in accordance with the shape of the gripper 16. For example, one or a plurality of joints may be held at the claw part of the teaching tool, and motion of the joint may be photographed by the camera 18 to be used as a supervised data. As another example, the distance between the claws of the teaching tool may be set to be equivalent to the distance between the claws of the gripper 16 when the distance between the claws of the gripper 16 is to be limited. When the degree-of-freedom of the posture of the gripper 16 is, for example, two, other degrees of freedom, such as a distance between these claws and a length of the claw may be added to be learned as the six-dimensional or more degree-of-freedom, and the graspable data may be output. The learning device in the present embodiment makes it possible to learn the six-dimensional or more degree-of-freedom and to estimate the data.

As a creation method of the supervised data, the teaching tool 2 in a shape different from the gripper 16 may be used as the above-stated embodiment, or a teaching tool in the same shape as the gripper 16 may be used as another example. In this case, it becomes possible to eliminate or reduce an error in the shapes between the teaching tool 2 and the gripper 16, and it becomes possible to avoid a problem where the teaching tool 2 is able to grasp in the supervised data but the actual gripper 16 is not able to grasp. When the teaching tool in the same shape as the gripper 16 is used, the supervised data may be collected by the human actually operating the robot 14 by using an operation system of the robot 14.

Further, the gripper 16 as the teaching tool may be moved to the location and posture where the object can be actually grasped by using a robot which can be transformed by the human applying physical force from the outside such as a collaborative robot, and the state of the location and posture may be set as the supervised data. In this case, the location and posture of the gripper 16 being the teaching tool may be acquired based on an image photographed by the camera 18 as same as the above-stated embodiment. When the information of the location and posture of the gripper 16 can be acquired through the robot 14, the camera 18 may photograph not only the gripper 16 but also the object, the information of the graspable location and posture may be acquired through the robot 14, and the image information of the object and the information of the graspable location and posture may be linked to set as the supervised data.

Further, when the supervised data is acquired, the actual object is not grasped, but the information of the object may be taken in by the camera 18, then the object may be virtually or augmentatively defined by using a VR (virtual reality) technology or an AR (augmented reality) technology, and the human may operate the teaching tool 2 or the gripper 16 to acquire the information of the location and posture capable of grasping the virtual object or the extensive object. Cost reduction to construct teaching usage to acquire the supervised data is thereby enabled, and deviation of teaching due to subjectivity can be suppressed because a plurality of persons easily teach a state of the same object.

Further, in the present embodiment, the information of the location and posture estimated by the learning model may be output as the image, and thereby, it becomes possible for a user to easily select the information of the graspable location and posture from among output candidates after automatically estimating the information of the graspable location and posture regarding the target object photographed by the camera 18.

In the present embodiment, since the learning model is based on FCN, a high-speed arithmetic operation is possible, and in particular, a temporal cost in the learning phase can be reduced. It is also effective when, for example, whether the information of the estimated location and posture was actually graspable or not is set as a new supervised data.

The grasping system 1 according to the present embodiment may be used when, for example, a great deal of or various kinds of objects are picked such as picking of products at a distribution warehouse, and picking at a factory, and so on. For example, the grasping system 1 may be used when a user is difficult to approach an object or the user is not desired to approach an object such as picking of the object in a clean room, and remote operation is performed. Further, when the robot 14 operates by using a tool, the grasping system 1 may be applied to grasp the tool.

In the above-stated explanation of the embodiment, though terms indicating the directions such as perpendicular, horizontal, and vertical are used, these may be defined anyway as long as the directions can be relatively determined in the grasping system 1. For example, the camera 18 may be set to photograph a direction horizontal to gravity in the grasping system 1, and in this case, an x-axis may be defined as an axis in parallel to a photographed plane of the camera 18 and horizontal to the gravitational direction, and a y-axis may be defined as an axis in parallel to the photographed plane and perpendicular to the x-axis, and a z-axis may be defined as an axis perpendicular to the photographed plane of the camera 18. Further, each axis is not necessary to be orthogonal with each other in a strict sense as long as each axis is a linearly independent axis where a three-dimensional location in the grasping system 1 can be uniquely determined.

The coordinate system is not limited to an orthogonal coordinate system, and other coordinate systems such as, for example, a cylindrical coordinate system can be used in accordance with an implemented situation. The posture is also the same, and it is not limited to the above-stated R, P, Y as long as the posture can be uniquely determined in the grasping system 1. For example, the posture may be represented by Euler angles, or by using an argument and a direction cosine. The location and the posture may be represented by anything as long as the locations and the postures of the teaching tool 2 and the gripper 16 can be uniquely determined by the three-dimensional location and the three-dimensional posture, and it is possible to select ones which are easy to use in system design.

In all of the descriptions, at least a part of the grasping system 1 may be formed by hardware, or formed by software and CPU or the like may execute through information processing of the software. When the system is formed by the software, programs that carry out functions of the grasping system 1 and at least a part thereof may be stored in a storage medium such as a flexible disk or a CD-ROM, and they may be read and executed by a computer. The storage medium is not limited to detachable media such as a magnetic disk and an optical disk and may be a hard disk device and a fixed-type storage medium such as a memory. That is, it may be one where information processing by the software is concretely implemented by using hardware resources. Further, processing by software may be implemented on a circuit such as a digital circuit, an analog circuit, or an FPGA (field-programmable gate array), and executed by hardware. Control circuits may be included and a part or all of the functions may be controlled by these circuits. The generation of the learning model and the processing after the input to the learning model may be performed by using, for example, an accelerator such as a GPU.

The learning model according to the present embodiment can be used as a program module being a part of artificial-intelligence software. That is, the CPU of the computer 10 may operate so as to perform an arithmetic operation for the image data photographed by the camera 18 which is input to the input layer of the convolutional network based on the model stored in the learning model storage part 112, and to output the result from the output layer of the convolutional network.

A person skilled in the art may come up with additions, effects, or various kinds of modifications of the present disclosure based on the above-described entire description, but modes of the present disclosure are not limited to the above-described individual embodiments. Various kinds of addition, changes, and partial deletion can be made within a range that does not depart from the conceptual idea and the gist of the present disclosure derived from the contents stipulated in claims and equivalents thereof.

The invention claimed is:

1. A system comprising:
an end effector configured to manipulate an object;
at least one processor configured to generate, by inputting information of the object into a neural network model, information of at least one of a location or a posture for manipulating the object by the end effector;
wherein the end effector manipulates the object based on the generated information, and
the neural network model is learned by using data generated based on at least one of a virtual object or an augmented object.

2. The system according to claim 1, wherein at least one of the virtual object or the augmented object is generated based on information of a real object acquired by a detector.

3. The system according to claim 2, wherein the detector acquiring the information of the real object is at least one of at least one camera, at least one camera which obtains distance information, or at least one detection device capable of three-dimensionally measuring the real object.

4. The system according to claim 1, wherein the data includes information of at least one of a location or a posture for manipulating at least one of the virtual object or the augmented object using an end effector that manipulates at least one of the virtual object or the augmented object.

5. The system according to claim 1, wherein the data is generated by using at least one of a virtual reality technique or an augmented reality technique.

6. The system according to claim 1 further comprising a controller that controls the end effector based on the generated information.

7. The system according to claim 1, wherein a detector acquiring the information of the object inputted into the neural network is installed on the end effector or an arm.

8. The system according to claim 1, wherein a detector acquiring the information of the object inputted into the neural network is at least one of at least one camera, at least one camera which obtains distance information, or at least one detection device capable of three-dimensionally measuring the object.

9. The system according to claim 1, wherein the generated information of the posture includes information capable of expressing rotation angles around axes.

10. The system according to claim 1, wherein the at least one processor inputs the information of the object into the neural network model and generates the information of at least one of locations or postures for manipulating the object by the end effector.

11. The system according to claim 1, wherein the end effector grasps the object based on the generated information.

12. The system according to claim 1, wherein the end effector is a gripper.

13. A method of learning a neural network model which is inputted information of an object to output information of at least one of a location or a posture for manipulating the object by an end effector comprising:
learning, by one or more processors, the neural network model based on data generated by using at least one of a virtual object or an augmented object.

14. The method according to claim 13, wherein the at least one of the virtual object or the augmented object is generated based on information of a real object acquired by a detector.

15. The method according to claim 14, wherein the detector acquiring the information of the real object is at least one of at least one camera, at least one camera which obtains distance information, or a detection device capable of three-dimensionally measuring the real object.

16. The method according to claim 13, wherein the data includes information of at least one of a location or a posture for manipulating at least one of the virtual object or the augmented object using an end effector that manipulates at least one of the virtual object or the augmented object.

17. The method according to claim 13, wherein the data is generated by using at least one of a virtual reality technique or an augmented reality technique.

18. The method according to claim 13, wherein the generated information of the posture includes information capable of expressing rotation angles around axes.

19. A manipulating method comprising:
inputting, by one or more processors, information of an object into a neural network model that has been learned using at least one of a virtual object or an augmented object;

generating, by the one or more processors, information of at least one of a location or a posture for manipulating the object by an end effector;

manipulating, by the one or more processors, the object by the end effector based on the generated information.

20. The method according to claim 19, wherein the at least one of the virtual object or the augmented object is generated based on information of a real object acquired by a detector.

21. The method according to claim 19, wherein the generated information of the posture includes information capable of expressing rotation angles around axes.

22. The method according to claim 19, wherein the generated information includes information of at least one of locations or postures for manipulating the object by the end effector.

23. The method according to claim 19, wherein the manipulating is grasping the object based on the generated information.

24. A non-transitory computer readable medium storing therein a program which executes a method, when executed by one or more processors, the method comprising:

inputting information of an object into a neural network model that has been learned using at least one of a virtual object or an augmented object;

generating information of at least one of a location or a posture for manipulating the object by an end effector; and manipulating the object by the end effector based on the generated information.

* * * * *